(12) United States Patent
Almeida E Silva et al.

(10) Patent No.: US 11,482,900 B2
(45) Date of Patent: Oct. 25, 2022

(54) INSULATING BODY FOR AN ELECTRIC MACHINE

(71) Applicant: Mahle International GmbH, Stuttgart (DE)

(72) Inventors: Roberto Almeida E Silva, Stuttgart (DE); Bernd Blankenbach, Boeblingen (DE); Terry Cox, Swinford (GB); Philip Grabherr, Stuttgart (DE); Niklas Kull, Stuttgart (DE); Tim Male, Telford (GB); Peter Pisek, Leitring (AT); Peter Sever, Murska Sobota (SI); Josef Sonntag, Nuertingen (DE); Martin Williams, Northkampton (GB)

(73) Assignee: Mahle International GmbH, Stuttgart (DE)

( * ) Notice: Subject to any disclaimer, the term of this patent is extended or adjusted under 35 U.S.C. 154(b) by 305 days.

(21) Appl. No.: 16/689,043

(22) Filed: Nov. 19, 2019

(65) Prior Publication Data

US 2020/0161918 A1 May 21, 2020

(30) Foreign Application Priority Data

Nov. 19, 2018 (DE) ............. 10 2018 219 822.5

(51) Int. Cl.
| | |
|---|---|
| *H02K 3/24* | (2006.01) |
| *H02K 1/20* | (2006.01) |
| *H02K 1/16* | (2006.01) |
| *H02K 3/28* | (2006.01) |
| *H02K 3/12* | (2006.01) |
| *H02K 3/34* | (2006.01) |
| *H02K 3/30* | (2006.01) |

(Continued)

(52) U.S. Cl.
CPC ............. *H02K 3/24* (2013.01); *B60K 1/00* (2013.01); *H02K 1/165* (2013.01); *H02K 1/20* (2013.01); *H02K 3/12* (2013.01); *H02K 3/28* (2013.01); *H02K 3/30* (2013.01); *H02K 3/345* (2013.01); *H02K 3/48* (2013.01); *B60K 2001/006* (2013.01)

(58) Field of Classification Search
CPC .......... H02K 1/00; H02K 1/165; H02K 1/20; H02K 3/12; H02K 3/24; H02K 3/28; H02K 3/30; H02K 3/34; H02K 3/345; H02K 3/48; B60K 1/00; B60K 2001/006
USPC ................................ 310/52, 54, 55, 58, 64
See application file for complete search history.

(56) References Cited

U.S. PATENT DOCUMENTS

| | | | |
|---|---|---|---|
| 5,214,325 A | 5/1993 | Matson et al. | |
| 9,300,179 B2 * | 3/2016 | Sawada | ............ H02K 3/34 |
| 9,748,822 B2 * | 8/2017 | Pal | ............ H02K 9/227 |

(Continued)

FOREIGN PATENT DOCUMENTS

JP 1998271738 A1 * 10/1998 ............ H02K 5/20

OTHER PUBLICATIONS

Murakami et al., English Machine Translation of JPH10271738 (Year: 1998).*

*Primary Examiner* — Rashad H Johnson
(74) *Attorney, Agent, or Firm* — Falk Ewers; Ewers IP Law PLLC (57) ABSTRACT

An insulating body for an electric machine includes outer walls of a plastic, which delimit a body interior. In the body interior, at least one winding zone for receiving a stator winding and at least one passage zone for receiving a cooling passage are provided.

18 Claims, 5 Drawing Sheets

(51) Int. Cl.
*B60K 1/00* (2006.01)
*H02K 3/48* (2006.01)

(56) References Cited

U.S. PATENT DOCUMENTS

| | | | | |
|---|---|---|---|---|
| 10,826,345 B2 * | 11/2020 | Huang | ............ | H02K 3/22 |
| 2014/0300220 A1 * | 10/2014 | Marvin | ............ | H02K 3/24 |
| | | | | 310/54 |
| 2020/0161917 A1 * | 5/2020 | E Silva | ............ | H02K 3/24 |

* cited by examiner

INSULATING BODY FOR AN ELECTRIC MACHINE

CROSS REFERENCE TO RELATED APPLICATIONS

This application claims priority to German patent application DE 10 2018 219 822.5, filed Nov. 19, 2018, the entire content of which is incorporated herein by reference.

TECHNICAL FIELD

The disclosure relates to an electric machine, in particular for a motor vehicle, having an insulating body. The disclosure also relates to a motor vehicle having such an electric machine.

BACKGROUND

Such an electric machine can generally be an electric motor or a generator. The electric machine can be designed as an external rotor machine or as an internal rotor machine.

A generic machine is known for example from U.S. Pat. No. 5,214,325. It includes a housing which surrounds an interior and which includes a circumferential shell in a circumferential direction of the housing radially bounding the interior, axially, on the one hand, a rear side wall axially bounding the interior and axially, on the other hand, a front side wall axially bounding the interior. A stator of the machine is permanently connected to the shell. In the stator, a rotor of the machine is arranged, wherein a rotor shaft of the rotor is rotatably mounted on the front side wall via a front shaft bearing.

Typically, the stator of a conventional electric machine includes stator windings which during the operation of the machine are electrically energized. In the process, heat is generated which for avoiding overheating and thus associated damage or even disruption of the stator has to be removed. For this purpose it is known from conventional electric machines to equip the same with a cooling device for cooling the stator—in particular the said stator windings. Such a cooling device includes one or more cooling passages through which a coolant flows and which are arranged in the vicinity of the standings in the stator—typically in the stator slots, i.e., in the intermediate spaces between two stator teeth that are adjacent in the circumferential direction of the stator, in which the stator windings are also received. Heat can be removed from the stator by way of heat transfer from the stator windings to the coolant.

Here it proves to be disadvantageous that an efficient heat transfer from the stator to the coolant flowing through the respective cooling passage can only be realized with substantial design expenditure. However, this has a disadvantageous effect on the production costs of the electric machine.

In addition it proves to be problematic in conventional machines that between the stator windings and the coolant conducted through the cooling passage and between the stator windings and the stator teeth of the stator an undesirable electrical short circuit can occur under certain conditions, when the winding insulation of the stator windings—for example due to the manufacture or brought about during the course of the assembly—should be damaged and after the stator windings have been introduced into the intermediate space the same—for example due to the assembly—touch the cooling passage or the coolant or the stator teeth.

SUMMARY

It is therefore an object of the present disclosure to provide an improved electric machine with which the above-described disadvantage is largely or even completely eliminated. In particular, the electric machine is improved by providing an improved cooling of the stator windings of the stator.

The object is achieved by an electric machine and a motor vehicle including the electric machine as described herein.

Accordingly, a general idea of the disclosure is to provide an electrical insulating body which, as prefabricated unit, can be inserted in an intermediate space—the so-called stator slot—between two stator teeth of a stator of an electric machine. Following the insertion of the insulating body into the intermediate space or into the stator slot, the stator windings can be introduced into the intermediate space. The insulating body present there facilitates on the one hand the positioning of the stator windings in the respective intermediate space and can, on the other hand, ensure the required electrical insulation of the stator winding relative to the cooling passage or the coolant conducted through the cooling passage during the operation of the electric machine, i.e., serves in particular as a heat transfer medium. The latter means that waste heat generated by the stator winding can be transferred via the plastic to the cooling passage that is present in the intermediate space, through which coolant flows during the operation of the machine. By selecting a suitable plastic with a high heat conductivity this effect can be improved. Since a plastic typically has electrically insulating properties it is additionally possible to electrically insulate the stator windings arranged within the insulating body relative to the stator teeth. In this way, an undesirable electrical short circuit between the conductor elements of the stator winding can—even in the case of a damaged winding insulation—be excluded.

A machine according to an aspect of the disclosure includes a rotor which is rotatable about an axis of rotation, by way of which an axial direction of the electric machine is defined, and a stator, which includes electrically conductive stator windings. Furthermore, the machine includes at least one cooling passage through which a coolant can flow for cooling the stator windings. The stator has stator teeth which are arranged spaced from one another along a circumferential direction of the rotor and extending along the axial direction, which stator teeth project from a stator body of the stator, preferentially radially to the inside, and carry the stator windings. Between two stator teeth adjacent in the circumferential direction, an intermediate space each is formed. According to an aspect of the disclosure, an insulating body is arranged or received in at least one intermediate space. Typically, such an insulating body is arranged in multiple intermediate spaces of the stator, particularly typically in all intermediate spaces. This insulating body includes outer walls consisting of a plastic, which partly bound a body interior. Typically, the plastic is also formed so as to be electrically insulating. Apart from this, the plastic can also be used for the heat transfer. In the body interior, at least one winding zone for receiving a stator winding and at least one passage zone for receiving a cooling passage are present. According to an aspect of the disclosure, a stator winding is arranged in the at least one winding zone of the insulating body. Likewise, a cooling passage for a coolant to flow through is arranged in the at least one passage zone of the insulating body.

In an exemplary embodiment, the insulating body includes at least one separating wall including the electrically insulating plastic, which subdivides the body interior into the at least one winding zone and into the at least one passage zone. When during the assembly of the insulating body in the stator slot during the course of the assembly of the stator the stator windings are arranged in the winding zone and the cooling passage in the passage zone of the insulating body, an undesirable electrical circuit between the stator winding and the cooling passage with the coolant can be excluded in this way—even with damaged winding insulation.

In an exemplary embodiment, two passage zones for receiving a first and a second cooling passage are provided in the body interior. In this exemplary embodiment, the at least one winding zone is—in the cross section perpendicularly to the axial direction—arranged between the two passage zones and separated from these two passage zones by two separating walls. Such a geometrical arrangement of the stator windings relative to the two cooling passages makes it possible to transfer waste heat from the stator winding on both sides to both cooling passages. In this way, a particularly intensive cooling of the stator windings can be achieved.

In a further exemplary embodiment, not only a single but two winding zones are provided, which in the cross section are arranged perpendicularly to the axial direction adjacent to one another. In this exemplary embodiment, the winding zones are separated from one another by a phase insulation consisting of the plastic. In this way, an undesirable electrical connection between the conductor elements arranged in the two different winding zones is excluded. This is true in particular when as material for the separating wall an electrically insulating plastic is selected. This allows arranging conductor elements in the two winding zones, which electrically separated from one another can be connected to different electrical phases of a current source. This can be necessary for example when the electric machine is to be operated as a two-phase machine.

Practically, the said phase insulation can be formed by a further separating wall of the insulating body. Particularly, the said separating wall is formed material-uniformly or even integrally on the outer walls of the insulating body. This version is accompanied by particularly low manufacturing costs.

In an exemplary embodiment, the outer walls and the at least one separating wall extend along an axial direction. In this exemplary embodiment, the at least one winding zone and the passage zone are arranged adjacent to one another in a cross section perpendicularly to the axial direction. This makes it possible to arrange the stator windings and the cooling passage for cooling the stator winding directly adjacent to one another. In this way, a particularly effective heat transfer from the stator winding to the cooling passage can be achieved. At the same time, the desired electrical insulation between stator windings and cooling passage is ensured by the separating wall.

The insulating body can have the geometrical shape of a cuboid. Likewise, the insulating body, in the cross section perpendicularly to the axial direction, can have the geometry of a trapezium, typically of a rectangle. This means that the insulating body is provided with a geometry which typically corresponds to that of the stator slot, into which the insulating body is inserted during the course of the assembly of the stator of the electric machine. In versions, other geometries are also conceivable, wherein with such alternative geometries it shall be true that particularly preferably these substantially correspond to the geometry of the stator slot concerned into which the insulating body is inserted.

According to another exemplary embodiment, an axial stop can be formed at an end of the insulating body that is axial with respect to the axial direction on at least one outer wall. Such an axial stop facilitates sliding the insulating body into the respective intermediate space along the axial direction. In particular, a correct axial positioning of the insulating body in the intermediate space is ensured.

According to a further exemplary embodiment, since easily realized technically, the axial stop can be formed as a wall collar projecting towards the outside, which is molded, in particular integrally, onto at least one outer wall of the insulating body. This exemplary embodiment involves particularly low production costs.

In a further exemplary embodiment, a spacing structure is provided on at least two outer walls, by which the outer walls can be inserted, at a defined spacing, into a stator slot of the stator of an electric machine. In this way, the inserting of the insulating body into the respective intermediate space forming the stator slot is facilitated. Thus, the insulating body, in particular, can be positioned particularly accurately in the intermediate space. Any gap resulting because of the spaced-apart arrangement of the insulating body from the two stator teeth or from the stator body between the outer walls and the stator teeth or the stator body can be filled with a heat transfer layer of plastic, which facilitates the heat transfer to the coolant flowing through the cooling passage.

Said spacing structure can be formed by projections which are arranged on an outside of the respective outer wall facing away from the body interior. This exemplary embodiment is technically particularly easy to realize and is accompanied by cost advantages during the production.

According to a further exemplary embodiment, these projections can be integrally molded onto the outer wall. This exemplary embodiment proves to be particularly cost-effective.

Practically, the insulating body can be an injection-molded part. Such an injection-molded part is technically easy to produce and therefore can be particularly cost-effectively manufactured in particular in large quantities. Alternatively or additionally, the insulating body can be a monolithic body. This likewise has an advantageous effect on the manufacturing costs. Alternatively or additionally to this, the insulating body can be an extruded body.

In an exemplary embodiment, the insulating body is inserted in the intermediate space. Such insertion of the insulating body in the intermediate space simplifies the mounting of the prefabricated insulating body in the respective intermediate space and thus the assembly of the stator of the machine.

Typically, the axial direction of the insulating body extends parallel to the axial direction of the electric machine.

The insulating body arranged in the intermediate space extends along an entire intermediate space length measured along the axial direction of the machine.

The insulating body includes two passage zones which are arranged in a cross section perpendicularly to the axial direction in a radially inner and in a radially outer end portion of the intermediate space. In this version, a first cooling passage is arranged in a first passage zone and a second cooling passage is arranged in a second passage zone. In this way, sufficient installation space for accommodating a stator winding with a large number of conductor elements is available in the region between the two passage zones or end portions. At the same time, an effective cooling of these stator windings by way of even two cooling passages is ensured.

The first passage zone with the first cooling passage can be arranged in a radially inner end portion of the intermediate space and the second passage zone with a second cooling passage can be arranged in a radially outer end portion of the intermediate space. With respect to the radial direction, the stator winding is arranged between both cooling passages so that an effective heat transfer from the stator winding to the coolant conducted through the two cooling passages becomes possible.

Typically, the at least one winding zone is arranged along the radial direction of the stator between the two passage zones. Both winding zones, i.e., the first and second winding zone, are arranged along the radial direction, typically directly next to one another, between the two passage zones. Thus, in this version, the first passage zone, the first winding zone, the second winding zone and the second passage zone are arranged next to one another along the radial direction from radially inside to radially outside.

In a further exemplary embodiment, the insulating body includes two winding zones which in the cross section perpendicularly to the axial direction are arranged adjacent to one another. In this further exemplary embodiment, the two winding zones are separated from one another by a phase insulation made of the plastic. This allows arranging conductor elements of the stator winding provided in the intermediate space in the two winding zones which are to be connected to different electric phases of a current source. This can be required when the machine is to be operated as a two-phase machine.

According to another exemplary embodiment, the stator winding is part of a distributed winding. In this exemplary embodiment, the insulating body is designed open radially inside, i.e., towards the opening of the intermediate space or of the stator slot. For this purpose, the corresponding outer wall of the insulating body can be omitted.

According to a further exemplary embodiment, the winding includes first and second conductor elements. In this further exemplary embodiment, the first conductor elements are arranged in the first winding zone and, for connection to a common first phase of an electric current source, electrically connected to one another. Analogously, the second conductor elements in this further development are arranged in the second winding zone and for connection to a common second phase of the electric current source electrically connected to one another. This allows operating the electric machine as two-phase electric machine with a high level of operational safety.

Typically, at least a first or/and second conductor element of the stator winding arranged in the intermediate space is surrounded in the cross section perpendicularly to the axial direction by the plastic. Typically, this applies to all first or/and second conductor elements of the stator winding. In this way it is ensured that no undesirable electrical short circuit of the stator winding with the coolant flowing through the cooling passage can occur.

Typically, the first or/and the second conductor elements can be formed as winding bars from an electrically conductive material. Typically, these conductor elements are formed mechanically rigid and such a formation of the conductor elements as winding bars, in particular from a mechanically rigid material, facilitates introducing the conductor elements into the insulating bodies arranged in the intermediate space of the stator for assembling the electric machine.

A further exemplary embodiment, according to which in the cross section perpendicular to the axial direction at least one winding bar, typically all winding bars, has/have the geometry of a rectangle with two narrow sides and with two wide sides, proves to be particularly installation space-saving.

Typically, the first conductor elements are electrically insulated relative to the second conductor elements by the phase insulation. An undesirable electrical circuit between two conductor elements, which are connected or are to be connected to different electrical phases of a current source can be avoided in this way.

According to a further exemplary embodiment, a first heat transfer layer made of plastic is arranged between the stator winding and the insulating body. In this way, the removal of heat from the stator winding can be improved. In particular, the undesirable formation of air gaps or air inclusions, which would diminish the heat removal from the stator winding, can be avoided.

In addition, a first heat transfer layer can be arranged between at least two adjacent conductor elements. An undesirable electrical short circuit between two adjacent conductor elements can be prevented in this way.

According to an exemplary embodiment, a second heat transfer layer made of plastic is arranged between the cooling passage and the insulating body. Thus, the transfer of the heat to the cooling passage or to the coolant flowing through the cooling passage can be improved. In particular, the undesirable formation of air gaps or air inclusions, which would diminish the heat transfer towards the cooling passage, can be avoided.

Alternatively or additionally to the first or second heat transfer layer, a third heat transfer layer made of plastic can be arranged between the insulating body and the stator body having the two adjacent stator teeth. In this way, the removal of heat from the stator teeth or from the stator body can be improved. In particular, the undesirable formation of an air gap or of an air inclusion, which would diminish the heat transfer away from the stator teeth or from the stator body, can be avoided.

Typically, the first conductor elements can be arranged in the radially inner winding zone and for connection to a common first phase of an electric current source electrically connected to one another. In this version, the two conductor elements are arranged in the radially outer winding zone and for connection to a common second phase of the electric current source, electrically connected to one another. This version allows realizing or operating the machine as two-phase machine with only a small installation space requirement. In particular, many conductor elements of the stator winding can be arranged in this way in a respective intermediate space, which increases the efficiency of the electric machine.

According to a further exemplary embodiment, at least one first or/and second conductor element, typically all first or/and second conductor elements, are surrounded in the cross section perpendicularly to the axial direction by the plastic. In this way, the electrical insulation of the conductor elements, in particular relative to the cooling passage, is redundantly improved.

Typically, the spacing structure of the insulating body can support itself on the stator teeth and, alternatively or additionally, on the stator body. In this way, the insulating body is fixed mechanically stable in the intermediate space.

In a further exemplary embodiment, a support structure can be provided on the surface portions of the two stator teeth or/and of the stator body facing the intermediate space, on which support structure the outer walls of the insulating bodies support themselves, so that the same are arranged spaced apart from the stator teeth or the stator body. In this way, inserting the insulating body in the respective intermediate space forming the stator slot is facilitated. In particular, the insulating body can be particularly accurately positioned in the intermediate space in this manner. Any air gaps or air inclusions materializing because of the spaced-apart arrangement of the insulating body relative to the two stator teeth or the stator body between the outer walls and the stator teeth or the stator body, can then be filled with a heat transfer layer of plastic. This results in an improved transfer of heat which is generated on the stator teeth and on the stator body during the operation of the machine, to the coolant flowing through the cooling passage.

Typically, the support structure is formed by projections which project from the stator teeth or from the stator body into the intermediate space. This exemplary embodiment is particularly easily implemented technically and is consequently accompanied by cost advantages in the production.

According to a further exemplary embodiment, the projections are formed integrally on the stator teeth or on the stator body. This exemplary embodiment proves to be particularly cost-effective.

In another exemplary embodiment, an additional cooling passage is formed in the stator body, in particular in the region of the stator body between the two stator teeth bounding the intermediate space. Such an additional cooling passage can for example be designed in the form of an opening or in the form of a bore in the respective stator body. Typically, the additional cooling passage is arranged in a region of the stator body which radially outside bounds the intermediate space and, from this intermediate space follows the intermediate space radially to the inside. In this way, an additional cooling effect can be generated in the intermediate space which is accompanied by an improved removal of heat from the stator winding arranged in this intermediate space.

In another exemplary embodiment, the plastic of the first heat transfer layer is formed by a typically electrically insulating first plastic material. Alternatively or additionally, the plastic of the second heat transfer layer in this exemplary embodiment can be formed by a typically electrically insulating second plastic material. Alternatively or additionally, the plastic of the third heat transfer layer in this exemplary embodiment can be formed by a typically electrically insulating third plastic material. Alternatively or additionally, the plastic of the insulating body in this exemplary embodiment, in particular of the outer walls of the insulating body, can be typically formed by an electrically insulating fourth plastic material.

The first plastic material or/and the second plastic material or/and the third plastic material or/and the fourth plastic material can be a thermoplastic. Alternatively or additionally, the first plastic material or/and the second plastic material or/and the third plastic material or/and the fourth plastic material can be a thermosetting plastic. The thermal conductivity of both thermosetting plastics and also thermoplastics is adjustable by selecting the material composition. Thus, the thermal conductivity of a thermoplastic can be equal or greater than that of a thermosetting plastic etc. and vice versa. A use of thermoplastics has various advantages relative to the use of thermosetting plastics. Because of the reversible shaping process applied during its processing, thermoplastics are better recyclable or, compared with thermosetting plastics, have a lower brittleness and improved damping properties. However, since thermoplastics are usually more expensive in procurement than thermosetting plastics, it is advisable for the sake of costs, to employ thermoplastics selectively. The use of a thermosetting plastic with reduced adjusted thermal conductivity in those regions which, concerning heat transfer, are considered less critical, is accompanied by reduced production costs for the electric machine.

Typically, the first or/and second or/and third or/and fourth plastic material have identical heat conductivities. Alternatively or additionally, the first or/and second or/and third or/and fourth plastic material can have different heat conductivities.

The first or/and second or/and third or/and fourth plastic material can be identical materials. However, the first or/and second or/and third or/and fourth plastic material can also be different materials.

The heat conductivity of the plastic, in particular of the first or/and second or/and third or/and fourth plastic material can be at least 0.5 W/mK, typically at least 1 W/mK.

According to an exemplary embodiment, the stator winding is part of a distributed winding.

The disclosure also relates to a motor vehicle having an electric machine described above. The advantages of the electric machine stated above thus apply also to the motor vehicle according to an aspect of the disclosure.

It is to be understood that the features mentioned above and still to be explained in the following cannot only be used in the respective combination stated but also in other combinations or by themselves without leaving the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
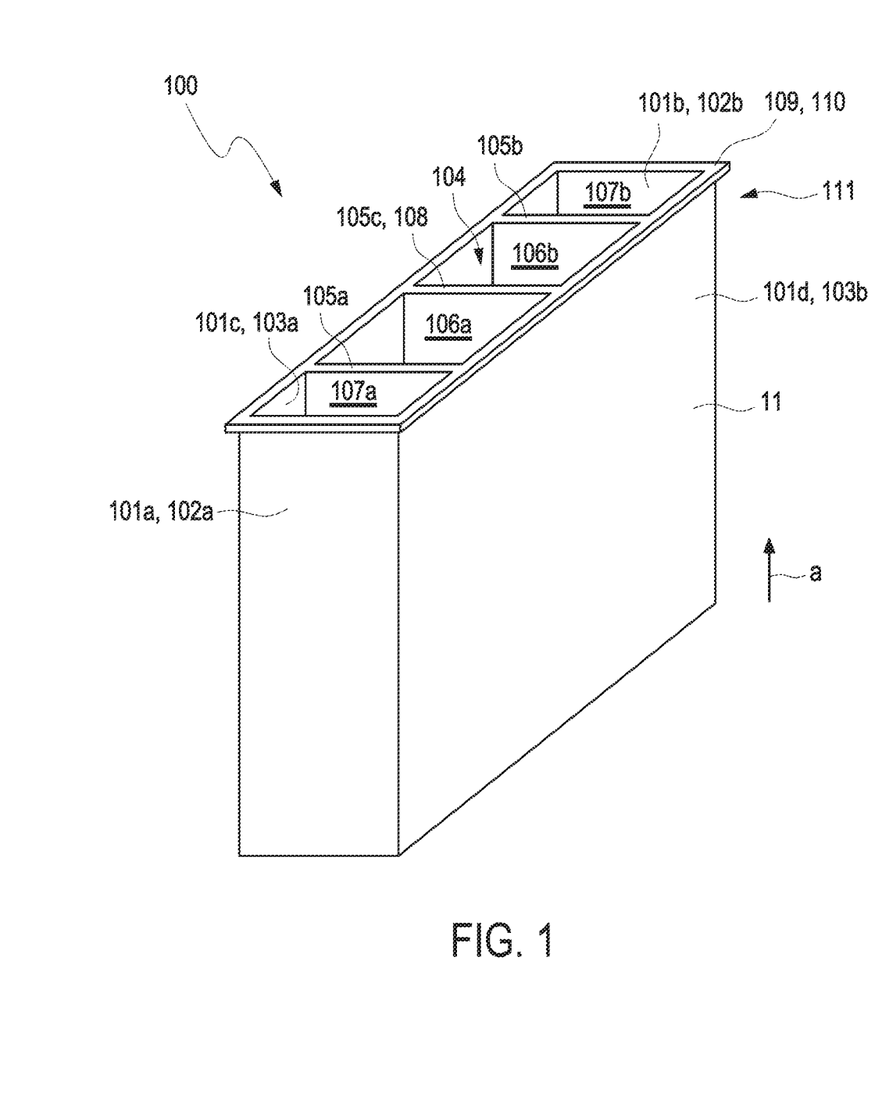
FIG. 1 shows an insulating body in an isometric representation according to an exemplary embodiment of the disclosure.
Figure 2:
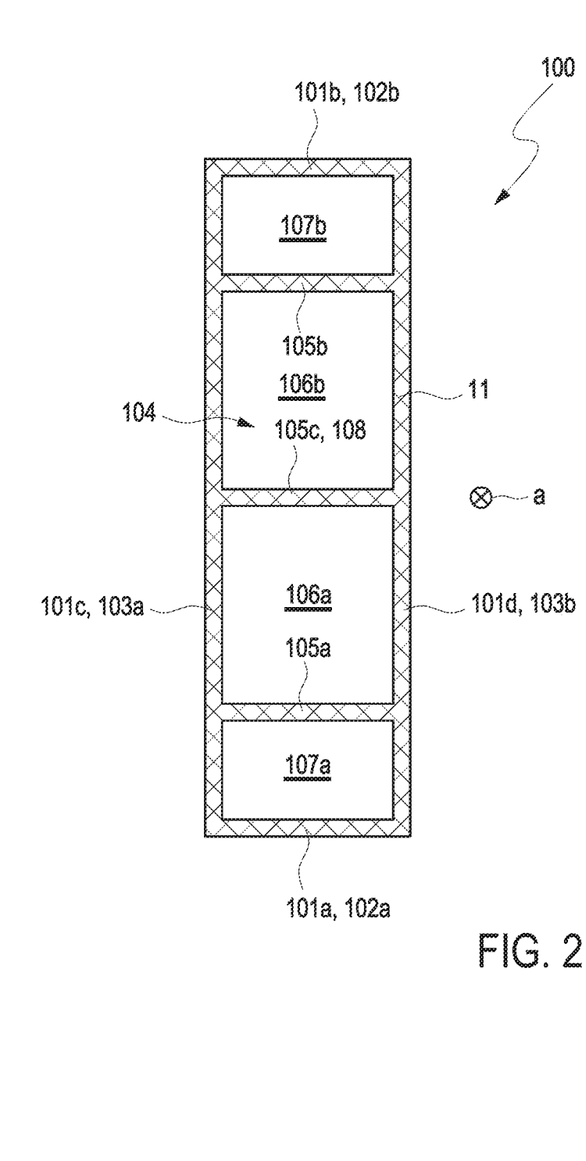
FIG. 2 shows a sectional view of the insulating body shown in FIG. 1.

FIGS. 1 and 2 show an exemplary embodiment of an insulating body 100 made of plastic 11 for a stator of an electric machine. Typically, the insulating body 100 is an injection-molded part. Apart from this, the insulating body 100 can be a monolithic body and, alternatively or additionally, an extruded body.

FIG. 1 shows the insulating body 100 in an isometric representation, and FIG. 2 shows the insulating body 100 in a sectional view. The insulating body 100 bounds a body interior 104. According to FIG. 1, the insulating body 100 has the geometrical shape of a cuboid. This cuboid is formed by four outer walls 101*a*, 101*b*, 101*c*, and 101*d* made of plastic 11. Outer walls 101*a-d* extend along an axial direction a. In the cross section perpendicularly to the axial direction as shown in FIG. 2, the outer walls 101a-d form two narrow sides 102a and 102b and two wide sides 103a and 103b. The two narrow sides 102a and 102b lie opposite one another. Analogously, the two wide sides 103a and 103b lie opposite one another. The two narrow sides 102a and 102b are typically arranged orthogonally to the two wide sides 103a and 103b.

As is evident from the FIGS. 1 and 2, the body interior 104 is subdivided by separating walls 105a, 105b, and 105c made of plastic 11, which likewise extend along the axial direction a, into a first and second winding zone 106a and 106b and into a first and second passage zone 107a and 107b. The first separating wall 105a is thus arranged between the first winding zone 106a and the first passage zone 107a. The second separating wall 105b is arranged between the second winding zone 106b and the second passage zone 107b.

The third separating wall 105c is arranged between the first and the second winding zone 106a and 106b. In the cross section shown in FIG. 2, the three separating walls 105a, 105b, and 105c each extend parallel to one another and additionally extend parallel to the outer walls 101c and 101d. Accordingly, the three separating walls 105a, 105b, and 105c extend orthogonally to the two outer walls 101a and 101b.

The two passage zones 107a and 107b serve for receiving a first or second cooling passage (not shown in the FIGS. 1 and 2). Analogously, the two winding zones 106a and 106b serve for receiving conductor elements of the stator winding (not shown in the FIGS. 1 and 2).

As is evident from FIGS. 1 and 2, the two winding zones 106a and 106b are arranged adjacent to one another and next to one another. The two winding zones 106a and 106b are additionally arranged between the two passage zones 107a and 107b. Furthermore, the two winding zones 106a and 106b are electrically and spatially separated from one another by a phase insulation 108 of plastic 11. The phase insulation 108 is formed by the already introduced separating wall 105c.

As shown in FIG. 1, an axial stop 109 can be formed at an axial end 111 of the four outer walls 101a-101d of the insulating body 100.

The axial stop 109 can be formed as a partly or completely circumferential wall collar 110 projecting towards the outside, which is integrally molded on all four outer walls 101a-d of the insulating body 100.

Figure 3:
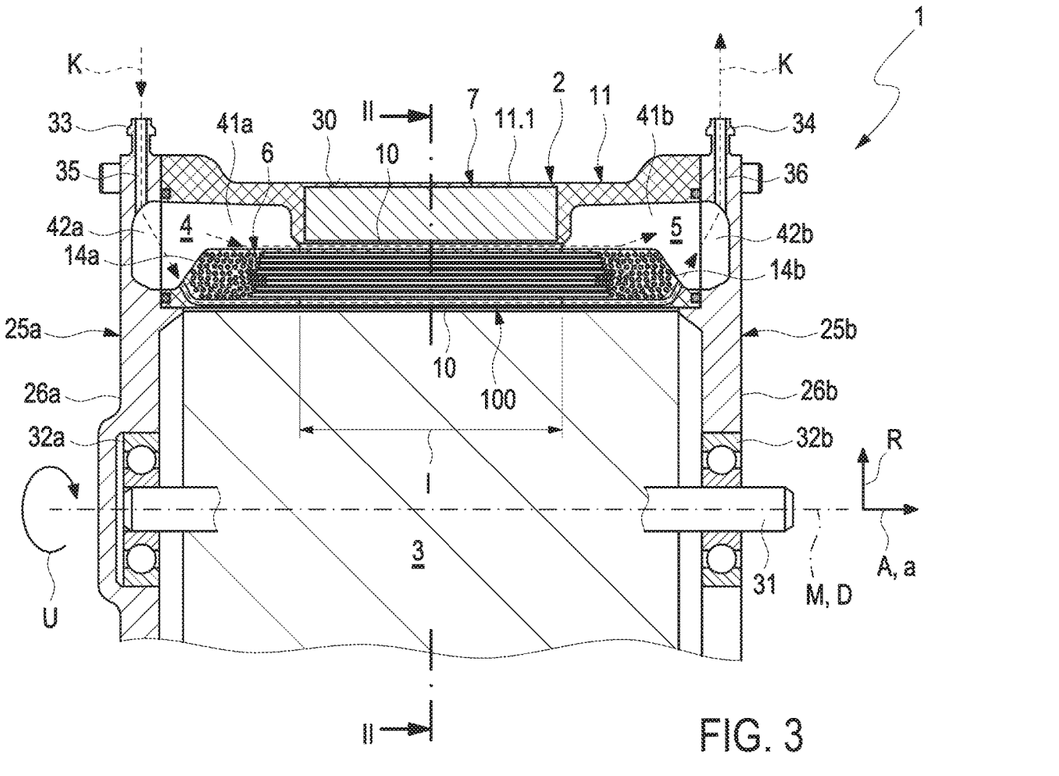
FIG. 3 shows an electric machine with an insulating body shown in FIGS. 1 and 2 according to an exemplary embodiment of the disclosure.

In the following, an electric machine 1 having the insulating body 100 described above is introduced by way of the FIGS. 3 and 4. The electric machine 1 is dimensioned so that it can be employed in a vehicle, typically in a road vehicle. FIG. 3 shows the electrical machine 1 in a longitudinal sectional view, and FIG. 4 in a cross sectional view.

Figure 4:
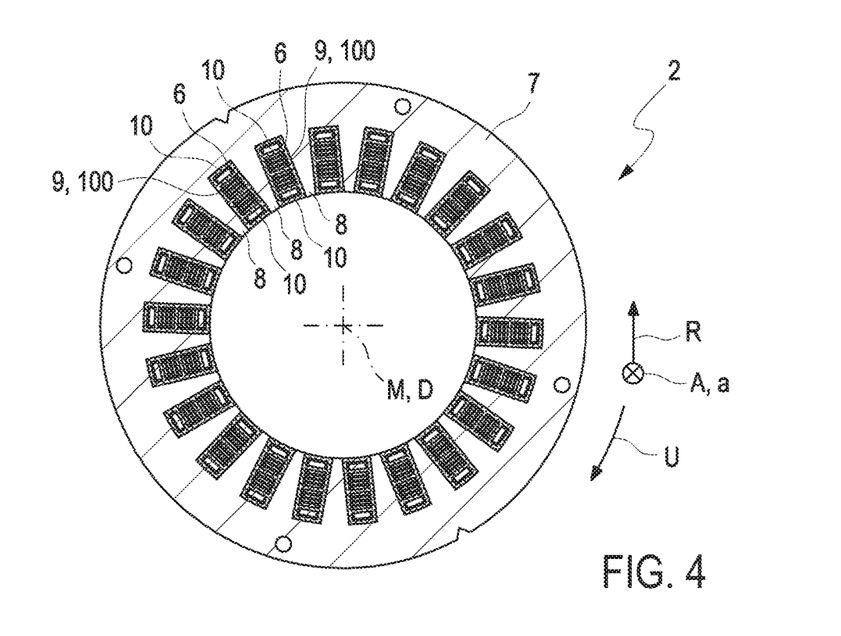
FIG. 4 shows the stator of the electric machine shown in FIG. 3 in a cross sectional view perpendicularly to the axis of rotation of the rotor.

The electric machine 1 includes a rotor 3 and a stator 2 which are only schematically shown in FIG. 3. For illustration, the stator 2 in FIG. 4 is shown in a cross sectional view perpendicularly to the axis of rotation D along the section line II-II of FIG. 3 in a separate representation. As shown in FIG. 3, the rotor 3 includes a rotor shaft 31 and can include a plurality of magnets which are not shown in more detail in FIG. 3, the magnetic polarization of which alternates along the circumferential direction U. The rotor 3 is rotatable about an axis of rotation D, the position of which is determined by the central longitudinal axis M of the rotor shaft 31. By the axis of rotation D, an axial direction A is defined which extends parallel to the axis of rotation D. A radial direction R stands perpendicularly to the axial direction A. A circumferential direction U rotates about the axis of rotation D.

As shown in FIG. 3, the rotor 3 is arranged in the stator 2. Thus, the electric machine 1 shown here is a so-called internal rotor machine. However also conceivable is a realization as a so-called external rotor machine, in the case of which the rotor 3 is arranged outside the stator 2. The rotor shaft 31 is rotatably mounted about the axis of rotation D on the stator 2 in a first shaft bearing 32a and, axially spaced apart thereto, in a second shaft bearing 32b.

In addition, the stator 2 includes in the known manner a plurality of stator windings 6 that can be electrically energized for generating a magnetic field. Through magnetic interaction of the magnetic field generated by the magnets of the rotor 3 with the magnetic field generated by the electrically conductive stator windings 6 the rotor 3 is set into rotary motion.

From the cross sectional view in FIG. 2, it is evident that the stator 2 can include an annular stator body 7, for example of iron. In particular, the stator body 7 can be formed of a plurality of stator body plates (not shown) that are stacked onto one another along the axial direction A and are glued to one another. Radially inside, multiple stator teeth 8 are molded onto the stator body 7 which extend along the axial direction A, project away from the stator body 7 radially to the inside and are arranged spaced apart from one another along the circumferential direction U. Each stator tooth 8 carries a stator winding 6. The individual stator windings 6 together form a winding arrangement. Depending on the number of the magnetic poles to be formed by the stator windings 6, the individual stator windings 6 of the entire winding arrangement can be electrically adhered to one another in a suitable manner.

During the operation of the machine 1, the electrically energized stator windings 6 generate waste heat that has to be discharged from the machine 1 in order to prevent an overheating and a damage or even destruction of the machine 1 accompanied by this. For this reason, the stator windings 6 are cooled with the help of a coolant K, which is conducted through the stator 2 and which absorbs the waste heat generated by the stator windings 6 by way of heat transfer.

In order to conduct the coolant K through the stator 2, the electric machine 1 includes a coolant distribution space 4, into which via a coolant inlet 33 a coolant K can be introduced. Along the axial direction A spaced apart from the coolant distribution space 4, a coolant collection space 5 is arranged. The coolant distribution space 4 fluidically communicates with the coolant collection space 5 by a plurality of cooling passages 10 of which in the representation of FIG. 3 only a single one is noticeable. In a cross sectional view perpendicularly to the axial direction A not shown in the figures, the coolant distribution space 4 and the coolant collection space 5 can each have an annular geometry. Along the circumferential direction U, a plurality of cooling passages 10 are arranged spaced apart from one another, which each extend along the axial direction A from the annular coolant distribution space 4 to the annular coolant collection space 5. Thus, the coolant K introduced into the coolant distribution space 4 via the coolant inlet 33 can be distributed over the individual cooling passages 10. Once the coolant K has flowed through the cooling passages 10 and the absorption of heat from the stator windings 6, the coolant K is collected in the coolant collection space 5 and via a coolant outlet 34 provided on the stator 2, again discharged from the machine 1.

As is evident from the representations shown in FIGS. 3 and 4, intermediate spaces 9 are formed between each two stator teeth 8 that are adjacent in the circumferential direction U. The said intermediate spaces 9 are known to the relevant person skilled in the art also as so-called "stator slots" or "stator slits", which just like the stator teeth 8 extend along the axial direction a. In each intermediate space 9 an insulating body 100 of plastic 11 for receiving a stator winding 6 and a cooling passage 10 is inserted. The insulating body 100 is arranged in the respective intermediate space 9 in such a manner that the axial direction a of the insulating body 100 extends parallel to the axial direction A of the electric machine 1 or the stator 2.

Typically, the insulating body 100 arranged in the respective intermediate space 9 extends along an entire intermediate space length 1 measured along the axial direction A of the machine 1 (see also FIG. 3 in this regard).

Figure 5:
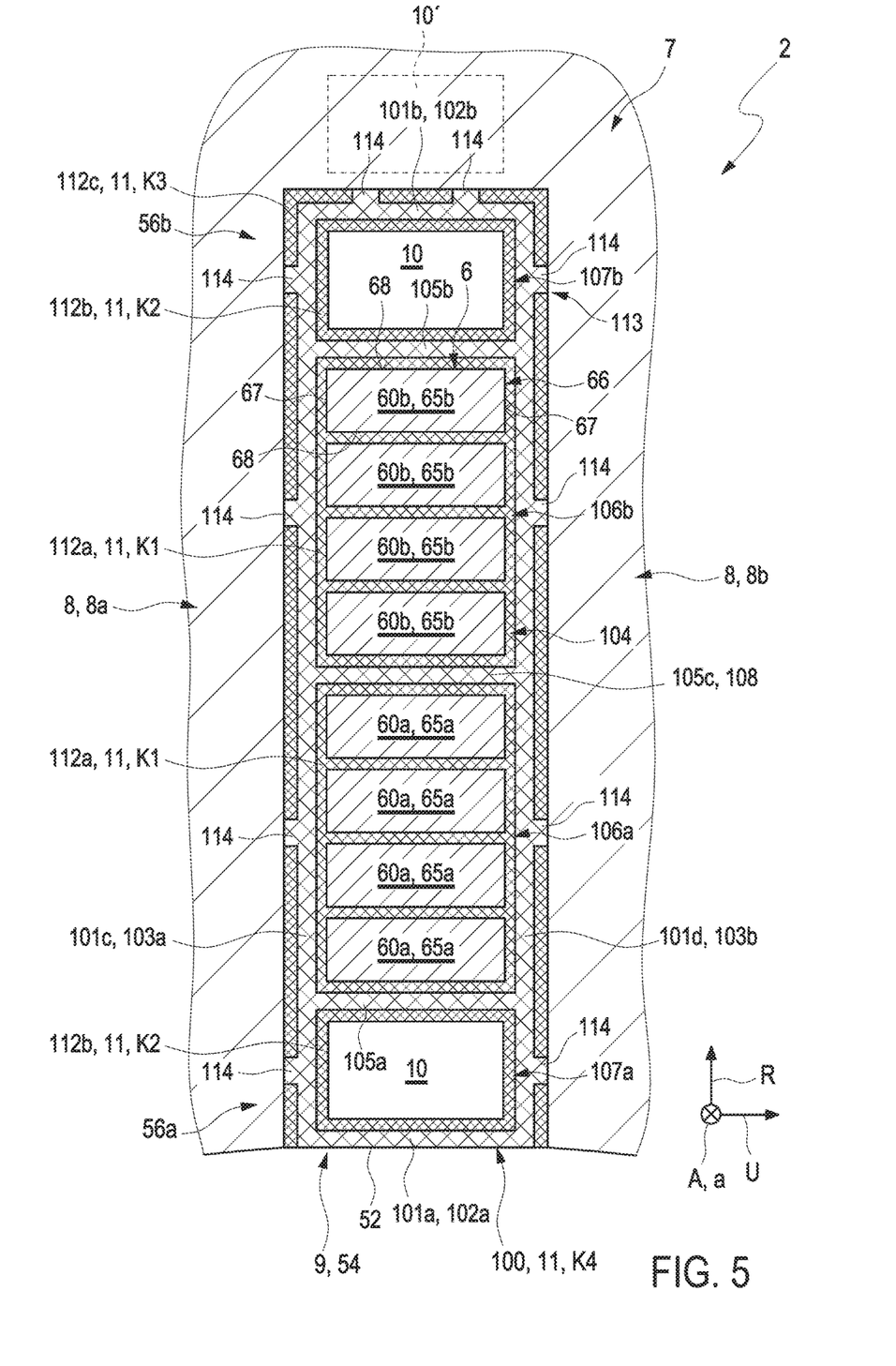
FIG. 5 shows a detailed view of the stator shown in FIG. 4 in the region of an intermediate space between two stator teeth that are adjacent in the circumferential direction.

FIG. 5 is now described which shows in detail an intermediate space 9 formed between two stator teeth 8—in the following also referred to as stator teeth 8a and 8b—adjacent in the circumferential direction U. FIG. 5 shows the intermediate space 9 in a cross sectional view perpendicularly to the axial direction A.

As shown in FIG. 5, the intermediate space 9 radially inside has an opening 52, i.e., is formed open radially inside. In the cross section perpendicularly to the axial direction A, the intermediate space 9 can have the geometry of a trapezium, in particular of a rectangle. In this cross section, the same applies to the geometry of the insulating body 100. Particularly practically, the intermediate space 9 and the insulating bodies 100 have the same geometry or outer contour. In the exemplary embodiment shown in FIG. 5, a first cooling passage 10 is arranged in the region of a radially inner end portion 56a of the intermediate space 9 or the stator slot 54, i.e., in the region of the opening 52. A further, second cooling passage 10 is arranged in the region of a radially outer end portion 56b of the intermediate space 9, i.e., in the vicinity of the stator body 7 bounding the intermediate space 9 radially outside.

As shown in FIG. 5, the stator winding 6 arranged in the intermediate space 9 or in the body interior 104 includes first and second conductor elements 60a and 60b. The first conductor elements 60a are arranged in the first winding zone 59a of the insulating body 100 and can for connection to a common first phase of an electric current source (not shown) be electrically connected to one another. This electrical connection can be effected axially outside the intermediate space 9 or the stator slot 54. The second conductor elements 60b are arranged in the second winding zone 59b of the insulating body 100 and for connection to a common second phase of the electric current source can be electrically connected to one another. This electrical connection can also be effected axially outside the intermediate space 9 or the stator slot 54. Thus, the first conductor elements 60a are electrically insulated relative to the second conductor elements 60b by the phase insulation 108.

As shown in FIG. 5, the first and second conductor elements 60a and 60b are each formed as winding bars 65a and 65b of an electrically conductive material and—because of their bar-like design—formed also mechanically rigid. In the cross section perpendicularly to the axial direction A, the winding bars 65a and 65b each have the geometry of a rectangle 66 with two narrow sides 67 and with two wide sides 68.

The first passage zone 107a with the first cooling passage 10 is arranged with respect to the radial direction R in the radially inner end portion 56a of the intermediate space 9. Accordingly, the second passage zone 107b with the second cooling passage 10 is arranged with respect to the radial direction R in the radially outer end portion 56b of the intermediate space 9. Along the radial direction R, the two winding zones 106a and 106b are thus arranged between the two passage zones 107a and 107b. Along the radial direction R from radially inside to radially outside the first winding zone 106a with the first conductor elements 60a thus follows the first passage zone 107a with the first cooling passage 10. The first winding zone 106a is followed by the second winding zone 106b with the second conductor elements 60b, which in turn is followed along the radial direction R by the second passage zone 107b with the second cooling passage 10.

As is additionally evident from FIG. 5, a first heat transfer layer 112a of plastic 11 can be arranged in the cross section perpendicularly to the axial direction A between the first and second conductor elements 60a and 60b of the stator winding 6 and the insulating body 100. The first heat transfer layer 112a, as shown in FIG. 5, can also be arranged between two adjacent conductor elements 60a and 60b. Typically, all first and second conductor elements 60a and 60b are surrounded by the plastic 11 in the cross section perpendicularly to the axial direction A.

Alternatively or additionally to the first heat transfer layer 112a, a (second) heat transfer layer 112b of plastic 11 can be arranged in the cross section perpendicularly to the axial direction A between the respective cooling passage 10 and the insulating body 100.

As is additionally evident from FIG. 5, a spacing structure 113 is formed on the outer walls 101a, 101c, and 101d of the insulating body 100, by which the outer walls 101a, 101c, and 101d can be arranged in the intermediate space 9 spaced apart from the stator teeth 8a and 8b and the stator body 7. The spacing structure 113 is practically formed by projections 114, which are arranged on an outside of the respective outer wall 101b, 101c, and 101d facing away from the body interior 104 of the insulating body 100. Particularly practically, the projections 114 can be integrally molded on the respective outer wall 101a, 101c, and 101d. The spacing structure 113 thus supports itself on the stator teeth 8a and 8b and on the stator body 7a. In a simplified version of the example, the spacing structure 113 can be omitted.

The gap 61 between the outer walls 101b, 101c, and 101d and the stator teeth 8a and 8b and the stator body 7 can be filled with a third heat transfer layer 112c of plastic. This means that alternatively or additionally to the first and second heat transfer layer 112a and 112b, a third heat transfer layer 112c of plastic 11 can be arranged in the cross section perpendicularly to the axial direction A between the insulating body 100 and the stator body 7 with the two adjacent stator teeth.

As is indicated in FIG. 5 in dashed line representation, a further cooling passage 10' can be formed and arranged in the stator body 7, which follows the intermediate space 9 radially inside. Such an additional cooling passage 10' can be realized in the form of a bore or an opening.

Figure 6:
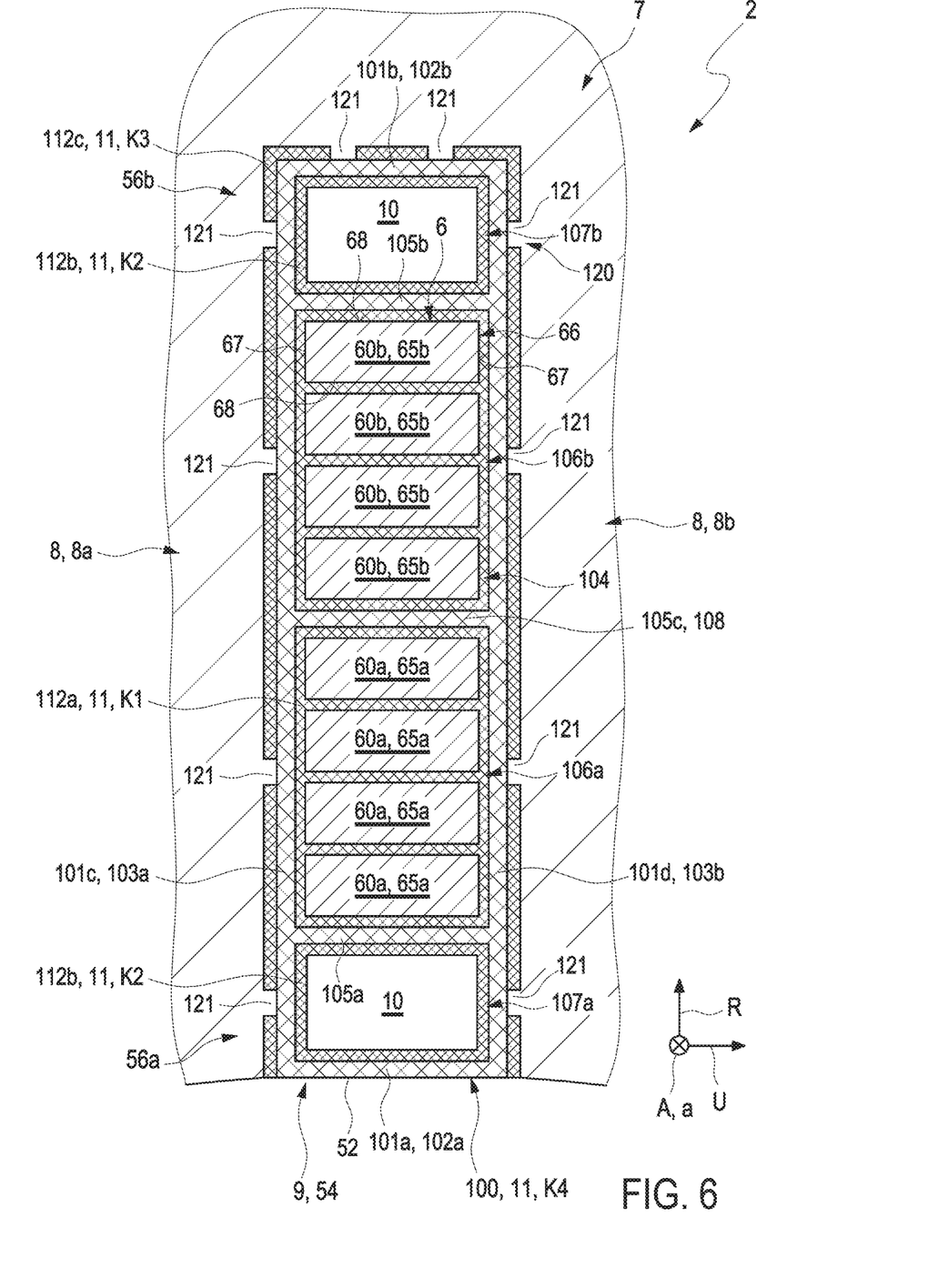
FIG. 6 shows a first version of the exemplary embodiment of the stator shown in FIG. 5.

FIG. 6 shows a version of the exemplary embodiment shown in FIG. 5. In the following, only the differences between the two versions are explained. According to FIG. 6, a support structure 120 can be formed on the surface portions of the two stator teeth 8a and 8b facing the intermediate space 9 and the stator body 7, on which support structure 120 the outer walls 101b, 101c, and 101d of the insulating body 100 can support themselves. Analogously to the spacing structure 113 of the insulating body 100, the support structure 120 can also be formed by projections 121 which project from the stator teeth 8a and 8b or from the stator body 7 in the intermediate space 9. The projections 121 of the support structure 120 can be integrally molded on the two stator teeth 8a and 8b or on the stator body 7.

Figure 7:
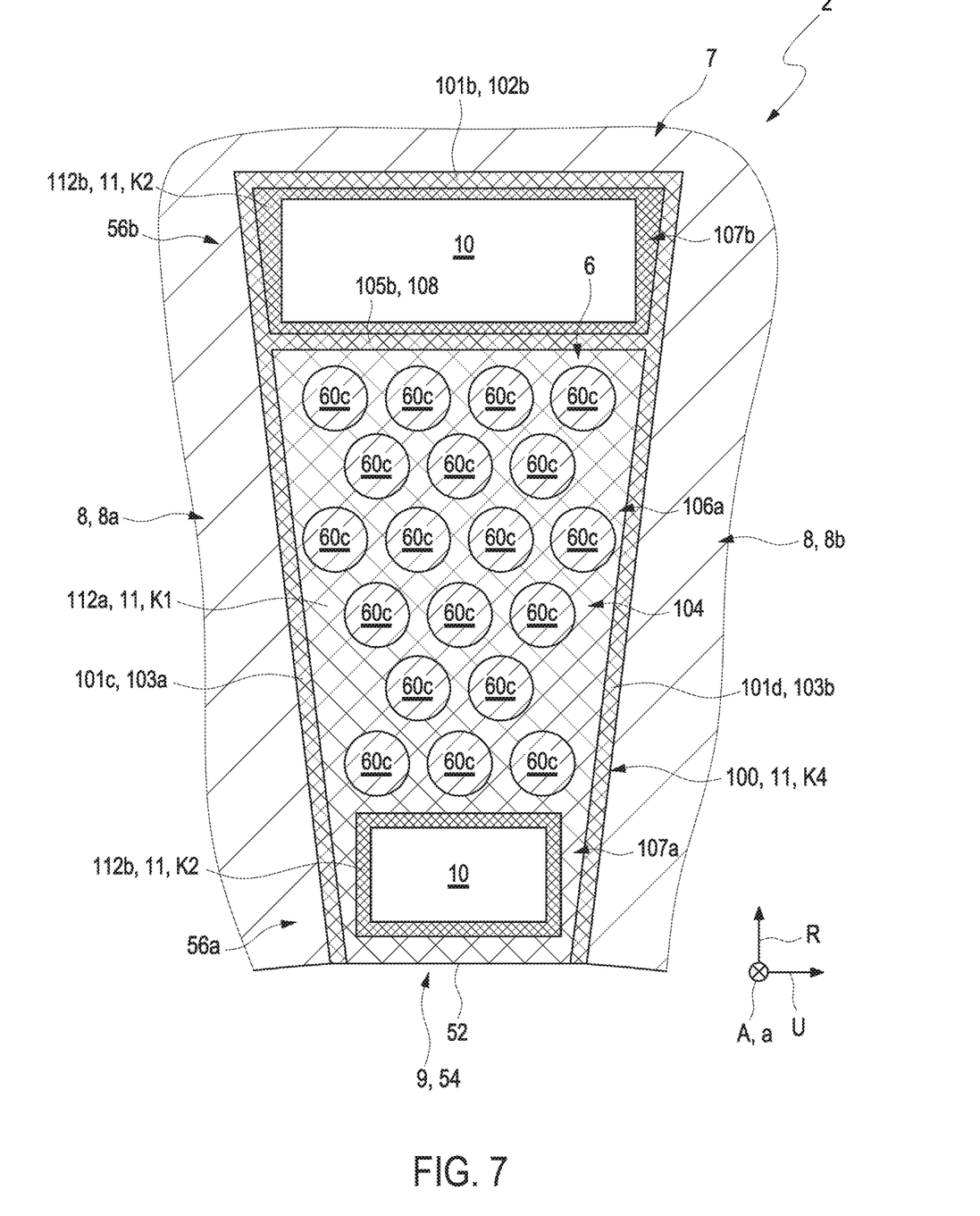
FIG. 7 shows a second version of the exemplary embodiment of the stator shown in FIG. 5.

FIG. 7 shows a further version of the exemplary embodiment shown in FIG. 5. In the following, only the differences between the two versions are explained. In the exemplary embodiment shown in FIG. 7, the insulating body 100, in the cross section perpendicularly to the axial direction a, A has the geometry of a trapezium with non-rectangular intermediate angles between each two adjacent outer walls 101a, 101b, 101c, and 101d. Furthermore, a stator winding 6 having flexible conductor elements 60c is arranged in the only winding zone 106a. In the example of FIG. 7, two cooling passages 10 are provided, wherein a first cooling passage 10 is arranged in the radially inner end portion 56a of the intermediate space 9 and a second cooling passage 10 is arranged in the radially outer end portion 56b of the intermediate space 9. Thus, the first passage zone 107a of the insulating body 100 with the first cooling passage 10 is arranged in the region of the radially inner end portion 56a. Accordingly, the second passage zone 107b with the second cooling passage 10 is arranged in the region of the radially outer end portion 56b of the intermediate space 9. In the version of FIG. 7, the insulating body 100 is formed open radially inside, i.e., towards the opening 52 of the intermediate space 9 or the stator slot 54. This means that the outer wall 101a of the insulating body 100 is omitted.

As is evident from FIG. 7, a separating wall 105b is provided only between the winding zone 106a and the second passage 107b. By contrast, such a separating wall has been omitted between the winding zone 106a and the first passage zone 107a. In a version, such a separating wall can also be provided here. Accordingly, the outer wall 105c shown in FIG. 7 can be omitted in a further version. Further combination possibilities materialize which are directly obvious to the relevant person skilled in the art from FIG. 7 and are therefore not explained explicitly.

In the exemplary embodiment, the plastic 11 of the first heat transfer layer 112a is formed by an electrically insulated first plastic material K1, the plastic 11 of the second heat transfer layer 112b is formed by an electrically insulating second plastic material K2 and the plastic 11 of the third heat transfer layer 112c is formed by an electrically insulating third plastic material K3. The plastic 11 of the electrical insulating body 100, in particular of the outer walls 101a-101d of the electrical insulating body 100 is formed by a likewise electrically insulating fourth plastic material K4.

In the exemplary embodiments shown in the figures, the fourth plastic material K4 of the insulating body 100 is a thermosetting plastic, whereas the first, second and third plastic material K1, K2, and K3 of the three transfer layers 112a, 112b, and 112c is a thermoplastic. It goes without saying that in versions thereto, other allocations of thermoplastic and thermosetting plastic to the four plastic materials K1, K2, K3, and K4 are also possible. In the exemplary embodiment, the first, second, and fourth plastic material K1, K2, and K4 each have a higher heat conductivity than the third plastic material K3. In this way, an effective heat transfer from the stator winding 6 to the cooling passages 10 is ensured. In the exemplary embodiments shown in the figures, the four plastic materials K1, K2, K3, and K4 are made of different materials. The heat conductivity of all four plastic materials K1, K2, K3, and K4 amounts to at least 0.5 W/mK, typically at least 1 W/mK.

In the following, reference is made again to FIG. 3. According to FIG. 1, the stator 2 with the stator body 7 and the stator teeth 8 is arranged axially between a first and a second bearing shield 25a and 25b.

As is evident from FIG. 3, a part of the coolant distribution space 4 is arranged in the first bearing shield 25a and a part of the coolant collection space 5 is arranged in the second bearing shield 25b. The coolant distribution space 4 and the coolant collection space 5 are thus each formed by a hollow space 41a and 41b provided in the plastic compound 11. The first hollow space 41a is complemented by a hollow space 42a formed in the first bearing shield 25a to form the coolant distribution space 4. Correspondingly, the second hollow space 41b is complemented to form the coolant collection space 5 by a hollow space 42b formed in the second bearing shield 25b. Thus, in the exemplary embodiment described above, the plastic 11 bounds the coolant distribution space 4 and the coolant collection space 5 at least partly.

Furthermore, a coolant feed 35 can be formed in the first bearing shield 25a which fluidically connects the coolant distribution space 4 with a coolant inlet 33 provided on the first bearing shield 25a on the outside, in particular on the circumferential side as shown in FIG. 1. In the second bearing shield 25b, a coolant discharge 36 can be formed accordingly, which fluidically connects the coolant collection space 5 with a coolant outlet 34 provided on the bearing shield 25b on the outside, in particular as shown in FIG. 1, on the circumferential side. This makes possible an arrangement of the coolant distribution space 4 or of the coolant collection space 5 in each case radially outside on the first or second end portion 14a and 14b of the stator winding 6 concerned and also in the extension of these end portions 14a and 14b along the axial direction A. The end portions 14a and 14b of the stator windings 6 which are thermally exposed to particularly heavy loads during the operation of the machine 1 are also particularly effectively cooled by this measure.

According to FIG. 3, the plastic 11 can also be arranged on an outer circumferential side 30 of the stator body 7 and thus form a plastic coating 11.1 on the outer circumferential side 30. Thus, the stator body 7 of the stator 2 typically formed from electrically conductive stator plates can be electrically insulated against the surroundings. Providing a separating housing for receiving the stator body 7 is thus no longer required.

It is understood that the foregoing description is that of the exemplary embodiments of the disclosure and that various changes and modifications may be made thereto without departing from the spirit and scope of the disclosure as defined in the appended claims.

What is claimed is:

1. An electric machine for a motor vehicle, the electric machine comprising:
    a rotor rotatable about an axis of rotation, by which an axial direction of the electric machine is defined;
    a stator including electrically conductive stator windings;
    at least one cooling passage that can be flowed through by a coolant for cooling stator windings; and
    an insulating body,
    wherein the stator includes stator teeth extending along the axial direction and arranged spaced from one another along a circumferential direction of the rotor,
    wherein the stator teeth project from a stator body of the stator radially to the inside and carry the stator windings,
    wherein between two stator teeth that are adjacent in the circumferential direction an intermediate space each is formed, wherein in at least one intermediate space the insulating body is arranged, which includes outer walls of a plastic, which bound a body interior, in which at least one winding zone for receiving a stator winding and at least one passage zone for receiving a cooling passage is provided, wherein in the at least one winding zone of the insulating body the stator winding is arranged and in the at least one passage zone of the insulating body the cooling passage for being flowed through by the coolant is arranged, wherein the insulating body is arranged in the intermediate space, extends along an entire intermediate space length measured along the axial direction of the electric machine, and includes two passage zones, which in a cross section perpendicularly to the axial direction of the electric machine are arranged in a radially inner and in a radially outer end portion of the intermediate space, and wherein in a first passage zone a first cooling passage and in a second passage zone a second cooling passage is formed.

2. The electric machine according to claim 1, wherein the insulating body includes at least one separating wall of the plastic, which subdivides the body interior into the at least one winding zone and into the at least one passage zone.

3. The electric machine according to claim 1, further comprising two winding zones arranged adjacent to one another in a cross section perpendicular to the axial direction,
wherein:
the two winding zones are separated from one another by a phase insulation of the plastic, and
the phase insulation is formed by a separating wall of the insulating body.

4. The electric machine according to claim 3, wherein:
the stator winding is a part of a distributed winding,
the electrically conductive stator windings include first conductor elements and second conductor elements,
the first conductor elements are arranged in a first winding zone and are electrically connected to one another for connecting to a common first phase of an electric current source,
the second conductor elements are arranged in a second winding zone and are electrically connected to one another for connecting to a common second phase of the electric current source, and
the first conductor elements are electrically insulated relative to the second conductor elements by the phase insulation.

5. The electric machine according to claim 4, wherein in the cross section perpendicular to an axial direction at least one first conductor element and/or at least one second conductor element, or all of the first conductor elements and/or all of the second conductor elements are surrounded by the plastic.

6. The electric machine according to claim 4, wherein the first conductor elements and/or second conductor elements are formed as winding bars of an electrically conductive material.

7. The electric machine according to claim 6, wherein in the cross section perpendicular to an axial direction at least one winding bar, or all winding bars, has/have a geometry of a rectangle with two narrow sides and two wide sides.

8. The electric machine according to claim 1, wherein:
the insulating body is an injection molded part, a monolithic body, and/or an extruded body.

9. The electric machine according to claim 1, wherein the axial direction of the insulating body extends parallel to the axial direction of the electric machine.

10. The electric machine according to claim 1, wherein the first passage zone with the first cooling passage is arranged in a radially inner end portion of the intermediate space and the with the second cooling passage is arranged in the radially outer end portion of the intermediate space.

11. The electric machine according to claim 1, wherein along a radial direction of the stator at least one winding zone or two winding zones is/are arranged between the two passage zones.

12. The electric machine according to claim 1, wherein:
the insulating body includes two winding zones arranged adjacent to one another in a cross section perpendicularly to the axial direction, and
the two winding zones are separated from one another by a phase insulation of the plastic.

13. The electric machine according to claim 1, wherein in the stator body an additional cooling passage is formed.

14. The electric machine according to claim 1, wherein:
the plastic is made of at least one of a first plastic material, a second plastic material, a third plastic material, or a fourth plastic material, and
the first, second, third, and fourth plastic materials are at least one of a thermoplastic and a thermosetting plastic.

15. The electric machine according to claim 14, wherein at least one of:
the first, second, third, and fourth plastic materials have identical heat conductivities,
at least two of the first, second, third, and fourth plastic materials or all of the first, second, third, and fourth plastic materials, each have different heat conductivities, or
the first, second, third, or fourth plastic materials have different heat conductivities.

16. The electric machine according to claim 14, wherein:
at least one of the first, second, third, and fourth plastic materials are made of identical materials, or
at least one of the first, second, third, and fourth plastic materials are made of different materials.

17. The electric machine according to claim 14, wherein a heat conductivity of the first, second, third, or fourth plastic materials amounts to at least 0.5 W/mK or at least 1 W/mK.

18. The motor vehicle comprising the electric machine according to claim 1.

* * * * *